United States Patent [19]

Kurabayashi et al.

[11] Patent Number: 5,099,398
[45] Date of Patent: Mar. 24, 1992

[54] ELECTRIC DOUBLE LAYER CAPACITOR

[75] Inventors: Ken Kurabayashi, Chigasaki; Yoshinobu Tsuchiya, Fujisawa; Seiichiro Kito, Ayase; Masanori Nakanishi, Kosai, all of Japan

[73] Assignee: Isuzu Motors Limited, Tokyo, Japan

[21] Appl. No.: 658,316

[22] Filed: Feb. 20, 1991

[30] Foreign Application Priority Data

Feb. 20, 1990 [JP] Japan .................. 2-039499

[51] Int. Cl.$^5$ .............................................. H01G 9/02
[52] U.S. Cl. .................................. 361/502; 29/25.03
[58] Field of Search ............... 361/306, 502, 534–540; 29/25.03, 25.42

[56] References Cited

U.S. PATENT DOCUMENTS 3,652,902 3/1972 Hart et al. ........................ 361/502
4,697,224 9/1987 Watanabe et al. .................. 361/502

*Primary Examiner*—Donald A. Griffin
*Attorney, Agent, or Firm*—Staas & Halsey

[57] ABSTRACT

An electric double layer capacitor has a pair of polarized electrodes in the form of electrode bodies each comprising a porous sintered body, and a pair of current collectors for collecting electric charges stored in the polarized electrodes, the current collectors being in the form of electrically conductive films. The electrically conductive films have surfaces dissolved by a solvent and joined to the electrode bodies with dissolved portions of the electrically conductive films being present in pores of the electrode bodies. The polarized electrodes and the current collectors are held in stable contact with each other, with a reduced contact resistance therebetween. The electric double layer capacitor thus has a small internal resistance.

2 Claims, 2 Drawing Sheets

ELECTRIC DOUBLE LAYER CAPACITOR

BACKGROUND OF THE INVENTION

The present invention relates to an electric double layer capacitor of high electrostatic capacitance which utilizes the principles of an electric double layer that is composed of an interface between activated carbon and electrolyte.

Recently, high-capacitance capacitors based on the electric double layer principles have been developed as backup power supplies for memories in electronic systems, and are widely used with microcomputers and IC memories.

One type of electric double layer capacitor is disclosed in U.S. Pat. No. 3,536,963, for example. Disclosed electric double layer capacitor comprises a frame-shaped gasket, a pair of polarized electrodes made of activated carbon particles and disposed in the gasket, a separator disposed between the polarized electrodes for preventing electrons from moving between the electrodes, and a pair of current collectors mounted respectively on the opposite surfaces of the polarized electrodes and having peripheral edges bonded to the gasket. The polarized electrodes are made as paste electrodes from a concentrated slurry which is a mixture of powdery or particulate activated carbon and an electrolyte.

It is important that the internal resistance of such an electric double layer capacitor with paste electrodes be low. The internal resistance of an electric double layer capacitor is greatly affected by the contact resistance of active carbon of the polarized electrodes and the contact resistance between the collector electrodes and the polarized electrodes.

Therefore, in order to reduce the internal resistance of the polarized electrodes and the contact resistance between the collector and polarized electrodes, each basic cell of the electric double layer capacitor should be kept under vertical pressure to bring the particles of the paste activated carbon into good electric contact with each other. Conventional electric double layer capacitors require each cell to be kept under a pressure of about 100 kg/cm$^2$ though it depends on the size of the electrodes, the size of the particles of the carbon material, or the kind of the electrolyte used. In prior electric double layer capacitors, the cells are kept under pressure by deforming the outer cases of the capacitors or bonding the current collectors strongly to gaskets. If an electric double layer capacitor is to be used as a large-capacitance capacitor, e.g., a power supply for energizing a motor, then it is necessary to increase the cross-sectional areas of the electrodes of the basis cell. Therefore, the pressure to be applied to the basic cell has to be increased. Increasing the pressure, however, causes some practical problems such as the selection of means for applying the pressure and the need for high rigidity for the outer cell which houses the basic cell.

In order to solve the problems of the polarized electrodes in the form of paste electrodes, there has been proposed an electric double layer capacitor which employs an electrode body composed of a sintered mixture of carbon powder having a large specific surface area and metal powder that is inert with respect to an electrolytic solution, as disclosed in Japanese Laid-Open Patent Publication No. 54(1979)-24100. The disclosed electric double layer capacitor includes a lead connected to the sintered electrode which is housed in a casing and extending through the wall of the casing for drawing electric charges stored in the sintered electrode. Ordinary electric double layer capacitors are designed to draw electric charges stored in a polarized electrode from current collectors that are held in contact with upper and lower surfaces of the polarized electrode. Attempts have been made to minimize the contact resistance between the polarized electrode and the current collectors.

Generally, a sintered polarized electrode and a current collector can be joined to each other in different ways as shown in FIGS. 3(a), 3(b), and 3(c) of the accompanying drawings. According to the process shown in FIG. 3(a), a current collector which comprises an electrically conductive film is simply held in contact with a polarized electrode. However, since the contact resistance between the current collector and the polarized electrode is large and the current collector and the polarized electrode are not in stable contact with each other, the resultant capacitor has a high internal resistance. The joining method shown in FIG. 3(b) uses an electrically conductive adhesive by which a current collector in the form of an electrically conductive film is joined to a polarized electrode. The contact achieved by this method is stabler than the contact established by the process shown in FIG 3(a). The internal resistance of the resultant capacitor cannot however be reduced beyond a certain limit because the adhesive layer is interposed at the interface between the polarized electrode and the current collector. FIG. 3(c) shows a joining arrangement in which a current collector in the form of an electrically conductive film is joined to a polarized electrode under pressure with heat. While a smaller contact resistance is achieved between the polarized electrode and the current collector by this joining process, it takes about 10 minutes to keep the current collector and the polarized electrode under pressure with heat until they are joined together. Furthermore, unless the current collector and the polarized electrode are uniformly pressed against each other, the current collector are wrinkled and ruptured.

SUMMARY OF THE INVENTION

It is an object of the present invention to provide an electric double layer capacitor which utilizes the principles of an electric double layer that is composed of an interface between activated carbon and electrolyte, the electric double layer capacitor having a sintered polarized electrode and a current collector which are held in stable contact with each other, so that the electric double layer capacitor has a relatively small internal resistance.

According to the present invention, there is provided an electric double layer capacitor comprising a pair of electrode bodies having surfaces confronting each other, each of the electrode bodies comprising a porous sintered body of joined minute active carbon particles, a separator interposed between the electrode bodies, a gasket housing the electrode bodies and the separator therein, and a pair of current collectors disposed on the respective other surfaces of the electrode bodies and having respective peripheral edges joined to the gasket, the current collectors being in the form of electrically conductive films, the electrically conductive films having surfaces dissolved by a solvent and joined to the electrode bodies with dissolved portions of the electrically conductive films being present in pores of the electrode bodies.

The above and other objects, features and advantages of the present invention will become more apparent from the following description when taken in conjunction with the accompanying drawings in which a preferred embodiments of the present invention is shown by way of illustrative example.

DETAILED DESCRIPTION OF THE PREFERRED EMBODIMENT

Figure 1:
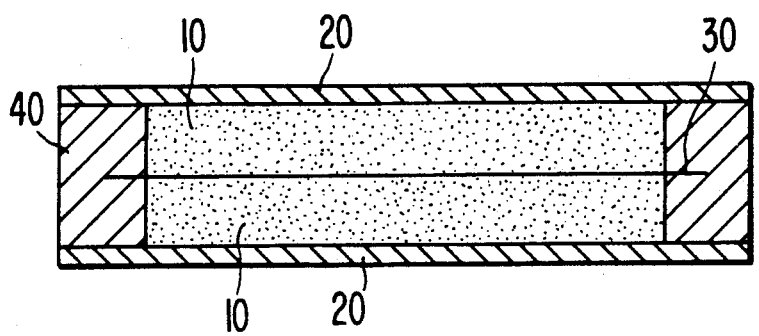
FIG. 1 is a cross-sectional view of an electric double layer capacitor according to the present invention.

FIG. 1 shows in cross section an electric double layer capacitor according to the present invention.

The electric double layer capacitor comprises a pair of electrode bodies 10 with surfaces confronting each other. Each of the electrode bodies 10 can be manufactured by a sintering apparatus. Specifically, powder of minute active carbon particles having an average particle diameter of about 20 μm is sintered into a plate-like porous sintered body. The plate-like porous sintered body is then impregnated with dilute sulfuric acid, thus providing a polarized electrode.

Figure 2:
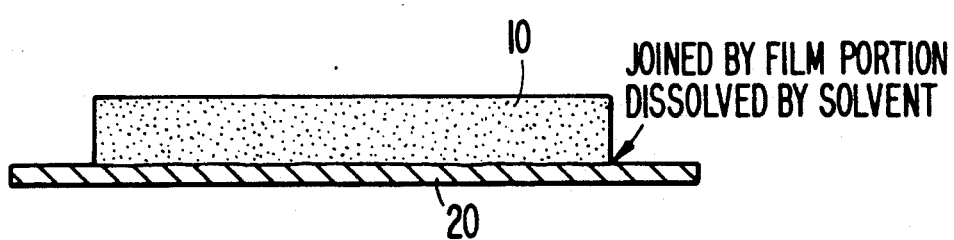
FIG. 2 is a cross-sectional view of an electrode body and a current collector, which are joined to each other, of the electric double layer capacitor shown in FIG. 2.
Figure 3A:
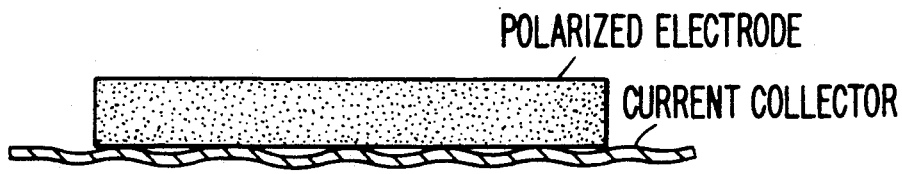
FIGS. 3(a), 3(b), and 3(c) are cross-sectional views showing conventional processes for joining an electrode body and a current collector.
Figure 3B:
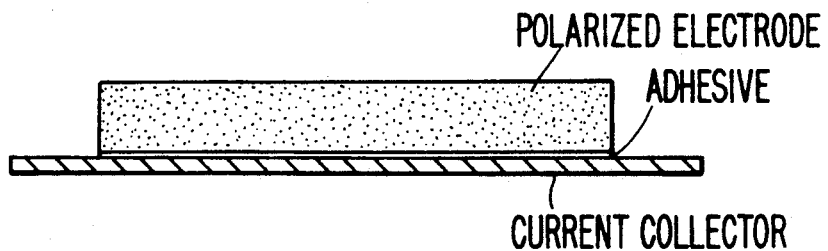
Figure 3C:
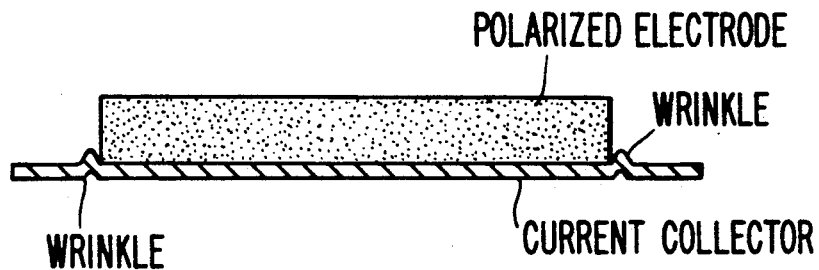

The electric double layer capacitor also includes a pair of current collectors 20 joined respectively the other surfaces of the polarized electrodes 10. Each of the current collectors 20 is in the form of an electrically conductive film made of a mixture of powder of an electrically conductive material such as carbon and either synthetic resin such as polyisobutylene, polyolefin, or the like, or rubber. The electrically conductive film is dissolvable by an organic solvent such as toluene, xylene, or the like. In order to join the current collector 20 to the polarized electrode 10, as shown in FIG. 2, a surface of the current collector 20 to be joined to the polarized electrode 10 is dissolved by the organic solvent, and the polarized electrode 10 is pressed against the dissolved surface of the current collector 20. The polarized electrode 10 is firmly joined to the current collector 20 when the organic solvent is evaporated from the dissolved surface of the current collector 20. Since the polarized electrode 10 is in the form of a porous sintered body, a dissolved portion of the current collector enters pores of the polarized electrode 10 and is securely bonded thereto. Consequently, the polarized electrode 10 and the current collector 20 are held in contact with each other through an increased surface area. The electric contact resistance between the polarized electrode 10 and the current collector 20 is thus reduced, and they are stably joined to each other.

The electric double layer capacitor also includes a separator 30 (FIG. 1) disposed between the polarized electrodes 10. The separator 30 comprises a piece of nonwoven fabric of porous polypropylene which is impregnated with an electrolytic solution. The separator 30 allows ions to pass therethrough but prevent electrons from moving therethrough.

The polarized electrodes 10 and the separator 30 are housed in an annular gasket 5 which is made of electrically nonconductive rubber or synthetic resin. The current collectors 20 have peripheral edges bonded to upper and lower surfaces of the gasket 5.

As described above, the electrode bodies which make up the polarized electrodes 10 are in the form of porous sintered bodies, and the current collectors 20 for collecting electric charges stored in the polarized electrodes 10 are in the form of electrically conductive films. The surfaces of the electrically conductive films to be joined to the electrode bodies are dissolved by an organic solvent, and a dissolved portion of the electrically conductive films enters pores of the electrode bodies, thus joining the electrode bodies to the electrically conductive films. After the solvent is evaporated from the dissolved surfaces of the electrically conductive films, the electrically conductive films and the electrode bodies are stably bonded to each other, and the contact resistance therebetween is reduced. Therefore, the electric double layer capacitor has a small internal resistance.

Since the electrode bodies and the electrically conductive films are joined to each other by dissolving surfaces of the electrically conductive films, the joining process can easily be effected without any special equipment. The electrode bodies and the electrically conductive films can firmly be bonded to each other in a short period of time which is required only to allow the solvent to be evaporated.

Although a certain preferred embodiment has been shown and described, it should be understood that many changes and modifications may be made therein without departing from the scope of the appended claims.

What is claimed is:

1. An electric double layer capacitor comprising:
   a pair of electrode bodies having surfaces confronting each other, each of said electrode bodies comprising a porous sintered body of joined minute active carbon particles;
   a separator interposed between said electrode bodies;
   a gasket housing said electrode bodies and said separator therein;
   a pair of current collectors disposed on the respective other surfaces of said electrode bodies and having respective peripheral edges joined to said gasket; and
   said current collectors being in the form of electrically conductive films, said electrically conductive films having surfaces dissolved by a solvent and joined to said electrode bodies with dissolved portions of the electrically conductive films being present in pores of said electrode bodies.

2. An electrode double layer capacitor according to claim 1, wherein said solvent comprises an organic solvent.

* * * * *

UNITED STATES PATENT AND TRADEMARK OFFICE
CERTIFICATE OF CORRECTION

PATENT NO. : 5,099,398
DATED : March 24, 1992
INVENTOR(S) : Ken Kurabayashi et al.

It is certified that error appears in the above-identified patent and that said Letters Patent is hereby corrected as shown below: ON TITLE PAGE:

[30] Foreign Application Priority Data, serial number, delete "2-" and at end of "039499" add --/1990--.

[56] References Cited, U.S. PATENT DOCUMENT, add

--4,014,730  3/1977  Selover et al.........156/331

4,023,079  5/1977  Selover et al.........361/502

4,594,758  6/1986  Watanabe et al........29/25.42--, and delete "3,652,902  3/1972  Hart et al..361/502"

Column 1, line 53, delete "basis" and insert --basic--.

Column 2, line 42, delete "are" and insert --is--.

UNITED STATES PATENT AND TRADEMARK OFFICE
CERTIFICATE OF CORRECTION

PATENT NO. : 5,099,398

DATED : March 24, 1992

INVENTOR(S) : Ken Kurabayashi et al.

It is certified that error appears in the above-identified patent and that said Letters Patent is hereby corrected as shown below:

Column 3, line 7, delete "embodiments" and insert --embodiment--; and line 35, insert --to-- between "respectively" and "the".

Column 4, line 3, delete "prevent" and insert --prevents--.

Signed and Sealed this

First Day of September, 1992

Attest:

DOUGLAS B. COMER

*Attesting Officer*     Acting Commissioner of Patents and Trademarks